United States Patent [19]

Nussbaumer

[11] 4,328,555

[45] May 4, 1982

[54] APPARATUS FOR COMPUTING TWO-DIMENSIONAL DISCRETE FOURIER TRANSFORMS

[75] Inventor: Henri J. Nussbaumer, La Gaude, France

[73] Assignee: International Business Machines Corporation, Armonk, N.Y.

[21] Appl. No.: 164,121

[22] Filed: Jun. 30, 1980

[30] Foreign Application Priority Data

Jul. 12, 1979 [FR] France .................. 79 18530

[51] Int. Cl.³ ............................................. G06F 15/31
[52] U.S. Cl. ...................................................... 364/726
[58] Field of Search ............................. 364/726, 827

[56] References Cited

U.S. PATENT DOCUMENTS 3,952,186  4/1976  Speiser et al. ................... 364/726

OTHER PUBLICATIONS

Nussbaumer "Implementation of Discrete Fourier Transforms with Polynomial Transforms" *IBM Technical Disclosure Bulletin,* vol. 21, No. 7 Dec. 78, pp. 2862–2865.

Quandalle "Multidimensional Discrete Fourier Transform Calculated Through Polynomial Transforms" *IBM Technical Diclosure Bulletin,* vol. 21, No. 7, Dec. 1978, pp. 2859–2861.

*Primary Examiner*—David H. Malzahn
*Attorney, Agent, or Firm*—Roy R. Schlemmer, Jr.

[57] ABSTRACT

An apparatus for computing the two-dimensional discrete Fourier transform (DFT) of an image comprised of $N \times N$ samples. The samples within each row are respectively multiplied by $W^{-n_1}$, $n_1 = 0, 1, \ldots, N-1$ and stored in a memory 17. A device 20 derives therefrom N polynomials of N terms by means of a polynomial transform. The terms of each of these polynomials are multiplied by $W^{n_1}$ and a device 28 computes the one-dimensional DFT thereof, thereby providing the $N^2$ terms of the transform of said image.

6 Claims, 4 Drawing Figures

APPARATUS FOR COMPUTING TWO-DIMENSIONAL DISCRETE FOURIER TRANSFORMS

DESCRIPTION

1. Technical Field

This invention relates to data processing devices designed to compute complex mathematical functions and, more particularly, to an apparatus which relies upon the use of polynomial transforms to compute the two-dimensional discrete Fourier transforms to two-dimensional signals.

2. Background Art

A discrete Fourier transform (DFT) is a well-known mathematical function which is used to convert the representation in the time domain of a sampled signal into its representation in the frequency domain, and vice versa. The development of digital techniques has enabled many digital devices to be implemented for the purpose of computing DFTs. Such devices, which only permit computing the one-dimensional DFT to a one-dimensional signal, are extensively used at the present time to process digital signals and, more specifically, one-dimensional signals.

This is being accompanied by significant development work in the field of digital image processing. Image processing is characterized in that the image signal is two-dimensional. In image processing, there are many applications in which it is useful and often necessary to map the image signal into its representation in the frequency domain. This can be done by using a two-dimensional DFT. Examples of such applications include the two-dimensional filtering of an image as described in "Theory and Application of Digital Signal Processing", by L. R. Rabiner and B. Gold, Chapter 7, Prentice-Hall, Inc., 1975; the analysis of pictures of the Earth as supplied by Earth resources satellites; and the X-ray technique called tomography.

The computation of a two-dimensional DFT involves a very large number of simple arithmetic operations such as multiplications and additions. The computation of a two-dimensional DFT of dimension N×N usually requires computing 2 N one-dimensional DFTs of N terms. (The dimension N×N means that N×N is the number of terms whose DFT is to be computed, or, to put it another way, that the image to be mapped is defined by N×N samples). If the number of multiplications corresponding to a one-dimensional DFT of dimension N is designated $M_1$, then the computation of the two-dimensional DFT will necessitate $2NM_1$ multiplications.

An article by H. J. Nussbaumer and P. Quandalle entitled, "New Polynomial Transform Algorithms for Fast DFT Computation" in Proceedings of the 1979 IEEE International Conference on Acoustics, Speech and Signal Processing, Washington, D.C., Apr. 2-4, 1979, describes two methods of computing multi-dimensional DFTs by means of polynomial transforms. The article shows the manner in which a multi-dimensional DFT can be mapped efficiently into reduced one-dimensional DFTs by using polynomial transforms. It also shows that, by combining this approach with Rader-Brenner's fast Fourier transform algorithm, the number of operations necessary to compute a multi-dimensional DFT can be significantly reduced.

A disadvantage of the methods described in said article is that the complete mapping of a multi-dimensional DFT into one-dimensional DFTs requires a very large number of polynomial transforms and may therefore be difficult to implement.

DISCLOSURE OF INVENTION

It is the object of this invention to provide an apparatus for computing two-dimensional DFTs which does not require the use of a large number of polynomial transforms and is relatively simple to implement.

Generally, this invention provides an apparatus for computing the two-dimensional discrete DFT.

$$\overline{X}_{k_1,k_2} \quad k_1,k_2=0, 1, \ldots, N-1$$

of $N^2$ terms $$x_{n_1,n_2} \quad n_1,n_2=0, 1, \ldots, N-1$$

arranged in N blocks of N terms each. The index $n_1$ indicates the position of a given term within a block, and the index $n_2$ the number of the block. The apparatus includes means for successively receiving the N blocks and means for multiplying the N terms within each block by N complex coefficients designated $W^{-n_1}$, respectively, thereby providing N blocks of N terms each which are then stored in a memory. The N block, designated $X_{n_2}(Z)$, are then applied to transformation means which derive therefrom N blocks written as $$\overline{X}_{(2k_1+1)k_2}(Z)$$

in accordance with the polynomial transform represented by the following relation:

$$\overline{X}_{(2k_1+1)k_2}(Z) = \sum_{n_2=0}^{N-1} X_{n_2}(Z) Z^{2n_2k_2} \text{modulo } (Z^N + 1)$$

wherein the multiplications by powers of Z correspond to rotations of the terms within the blocks followed by sign inversion of the overflow terms.

The apparatus of the present invention further includes means for respectively multiplying the N terms within each of the N blocks $$\overline{X}_{(2k_1+1)k_2}(Z)$$

by N complex coefficients $W^l$, $l=0, 1, \ldots, N-1$. The $N^2$ terms of the two-dimensional DFT $$\overline{X}_{k_1,k_2}$$

are supplied by computation means which determine the N terms of the one-dimensional DFT of each of the N blocks $$\overline{X}_{(2k_1+1)k_2}$$

whose terms have been multiplied by the coefficients $W^l$.

In another embodiment of the invention, the terms of the DFT $\overline{X}_{k_1,k_2}$ which correspond to $k_1$ odd and $k_1$ even are dealt with separately. Each of the N blocks of terms $x_{n_1,n_2}$ becomes a couple of reduced blocks of N/2 terms respectively written as $X_{n_2}{}^1(Z)$ and $X_{n_2}{}^2(Z)$. The reduced blocks $X_{n_2}{}^2(Z)$ are processed by an apparatus which is similar to the one used in the first embodiment of the invention and only differs therefrom in that the blocks being processed are only comprised of N/2 terms. The blocks $X_{n_2}^2(Z)$ provide the $N^2/2$ terms of $\overline{X}_{k_1,k_2}$ which correspond to $k_1$ even. The N reduced blocks $X_{n_2}^1$ are applied to transformation means which derive therefrom N reduced blocks written as $$\overline{X}^1_{(2p+1)k_2}(Z), \quad p=0, 1, \ldots, N/2-1,$$

in accordance with the polynomial transform $$\overline{X}^1_{(2p+1)k_2}(Z) = \sum_{n_2=0}^{N-1} X^1_{n_2}(Z) \, Z^{n_2 k_2} \text{modulo}\, (Z^{N/2}+1).$$

the N/2 terms of each of the blocks $$\overline{X}^1_{(2p+1)k_2}(Z)$$

are respectively multiplied by the coefficients $w^{2l}$, $l=0, 1, \ldots, N/2-1$. The $N^2/2$ terms of $\overline{X}_{k_1,k_2}$ which correspond to $k_1$ odd are supplied by computation means which compute the N/2 terms of the one-dimensional DFT of each of the N blocks $$\overline{X}^1_{(2p+1)k_2}(Z)$$

whose terms have been multiplied by the coefficients $w^{2l}$.

The foregoing and other objects, features and advantages of the invention will be apparent from the following more particular description of a preferred embodiment of the invention, as illustrated in the accompanying drawings.

BEST MODES FOR CARRYING OUT THE INVENTION

Figure 1:
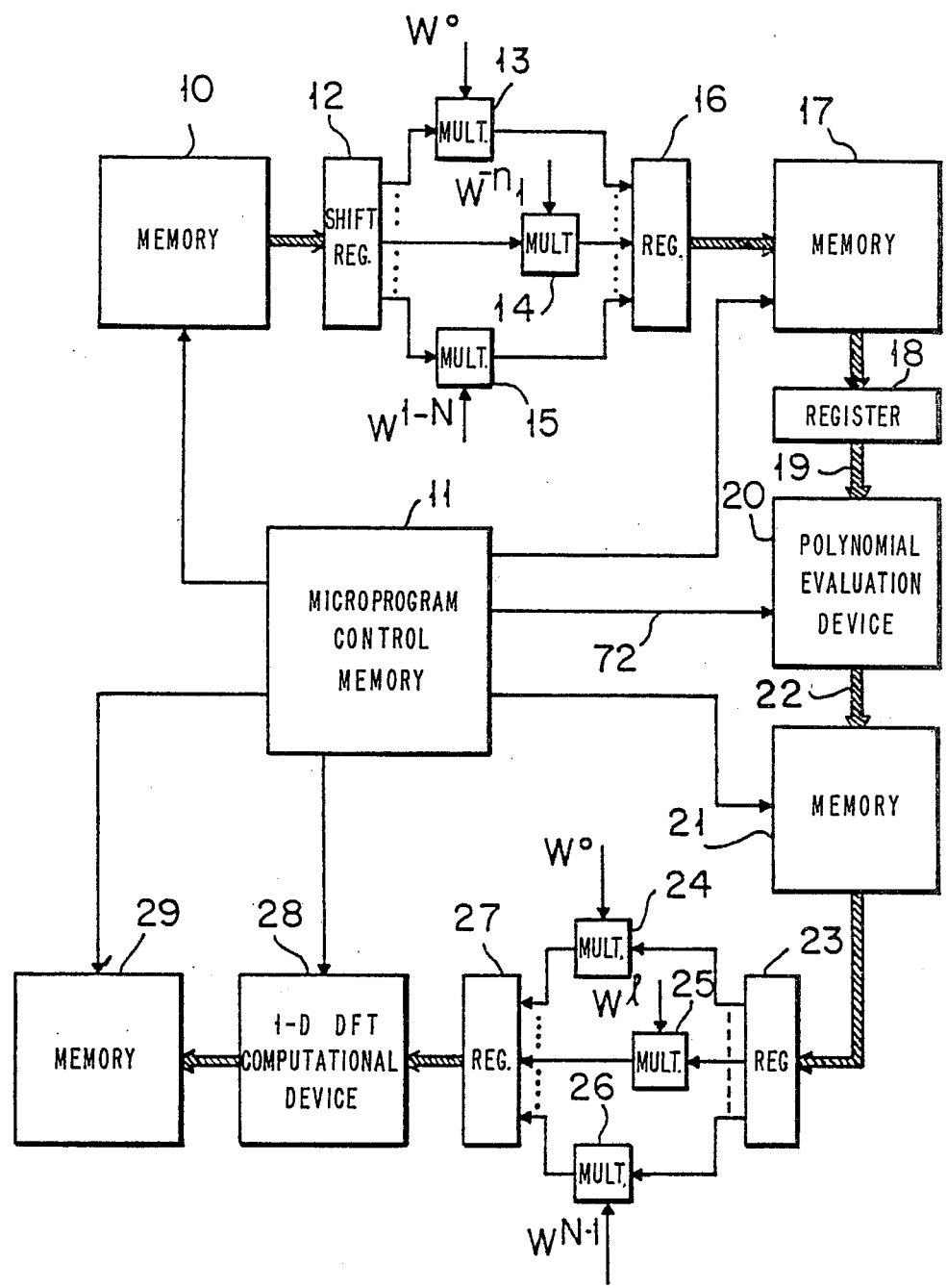
FIG. 1 is a block diagram illustrating a first embodiment of the invention.

Polynomial transforms have been discussed in several publications and in particular in the following articles:

"Digital Filtering Using Polynomial Transforms", by H. J. Nussbaumer, In Electronics Letters, Vol. 13, No. 13, June 23, 1977;

"Computation of Convolutions and Discrete Fourier Transforms by Polynomial Transforms", by H. J. Nussbaumer and P. Quandalle, in IBM Journal of Research and Development, Vol. 22, No. 2, March 1978.

It may however be convenient at this point to restate the definition of a polynomial transform.

Let $\{P_m(Z)\}$ be a set of N polynomial each of which is defined by the following relation $$P_m(Z) = \sum_{n=0}^{N-1} a_{n,m} z^n \quad m = 0, 1, \ldots, N-1 \quad (1)$$

The polynomial transform of the set $\{P_m(Z)\}$ is defined as a set of N polynomial $\{A_k(Z)\}$, each of which is expressed as $$A_k(Z) \equiv \sum_{m=0}^{N-1} P_m(Z) z^{2mk} \text{modulo}\, (Z^N+1) \quad k = 0, 1, \ldots, N-1 \quad (2)$$

($\equiv$ means identical with)

Similarly, the inverse transform is defined as $$P_l(Z) \equiv \qquad (3)$$

$$\frac{1}{N} \sum_{k=0}^{N-1} A_k(Z) Z^{-2lk} \text{modulo}\, (Z^N+1) \quad l = 0, 1, \ldots, N-1$$

The computation of a polynomial transform reduces to additions and to multiplications by powers of Z. For example, since relation (2) is defined modulo $(Z^N+1)$, we have $Z^N = -1$, and multiplications of the polynomials $P_m(Z)$ by powers of Z correspond to simple rotations of the terms $a_{n,m}$ within the polynomials $P_m(Z)$ followed by sign inversion of the overflow terms. Polynomial additions are performed by adding separately the terms corresponding to the same power of Z. For a more detailed discussion, reference to the aforementioned articles is suggested.

Before describing the apparatus of the present invention, we shall discuss its principles of operation. Let us consider the two-dimensional DFT $\overline{X}_{k_1,k_2}$, of dimension N×N, of the samples $x_{n_1,n_2}$, which is defined by the well-known relation $$\overline{X}_{k_1,k_2} = \sum_{n_1=0}^{N-1} \sum_{n_2=0}^{N-1} x_{n_1 n_2} e^{-j2\pi(n_1 k_1 + n_2 k_2)/N} \quad (4)$$

$k_1, k_2 = 0, \ldots, N-1$, where $j = \sqrt{-1}$.

Note that since $k_1$ and $k_2$ can both assume N different values, the DFT $\overline{X}_{k_1,k_1}$ is comprised of $N^2$ terms. If we put $$W = e^{-j\pi/N} \quad (5)$$

we may write relation (4) in the form $$\overline{X}_{k_1,k_2} = \sum_{n_1=0}^{N-1} \sum_{n_2=0}^{N-1} x_{n_1,n_2} W^{2(n_1 k_1 + n_2 k_2)} \quad (6)$$

Relation (6) may also be written in the form $$\overline{X}_{k_1,k_2} = \sum_{n_1=0}^{N-1} \sum_{n_2=0}^{N-1} x_{n_1,n_2} W^{-n_1} W^{n_1(2k_1+1)} W^{2n_2 k_2} \quad (7)$$

Replacing the representation given by relation (7) with an equivalent polynomial representation, we get $$X_{n_2}(Z) = \sum_{n_1=0}^{N-1} x_{n_1,n_2} W^{-n_1} Z^{n_1} \quad (8)$$

$$\overline{X}_{k_2}(Z) = \sum_{n_2=0}^{N-1} X_{n_2}(Z) W^{2n_2 k_2} \text{modulo}\, (Z^N + 1) \quad (9)$$

$$\overline{X}_{k_1,k_2} \equiv \overline{X}_{k_2}(Z) \text{ modulo } (Z - W^{2k_1+1}) \quad (10)$$

Note that:

since $n_1$ and $n_2$ can assume N different values, relation (8) defines N polynomials of N terms each;

since $n_2$ and $k_2$ can assume N different values, relation (9) defines N polynomials of N terms each; and $\bar{X}_{k1,k2}$ defines the DFT of $N^2$ terms.

Let us now assume that N is a power of 2. Since $(2k_1+1)$ is odd, the product $(2K_1+1)$ $k_2$ modulo N maps all values of $k_2$. Thus, $(2k_1+1)$ $k_2$ may be substituted for $k_2$ in relations (9) and (10), which yields the equivalent relations (11) and (12), respectively:

$$\bar{X}_{(2k1+1)k2}(Z) = \qquad (11)$$

$$\sum_{n2=0}^{N-1} X_{n2}(Z) W^{2n2k2(2k1+1)} \text{modulo } (Z^N + 1)$$

$$\bar{X}_{k1,(2k1+1)k2} \equiv \bar{X}_{(2k1+1)k2}(Z) \text{ modulo } (Z - W^{2k1+1}) \qquad (12)$$

Since, according to relation (12), $\bar{X}_{(2k130\ 1)k2}(Z)$ is defined modulo $(Z - W^{2k1+1})$, we get $Z = W^{2k1+1}$ and we may substitute Z for $W^{2k1+1}$ in relation (11), which becomes $$\bar{X}_{(2k1+1)k2}(Z) = \sum_{n2=0}^{N-1} X_{n2}(Z) Z^{2n2k2} \text{modulo } (Z^N + 1) \qquad (13)$$

$\bar{X}_{(2k1+1)k1}(Z)$ is a polynomial of N terms which may be written as $$\bar{X}_{(2k1+1)k2}(Z) = \sum_{l=0}^{N-1} Y_{(2k1+1)k2,l} Z^l \qquad (14)$$

where $Y_{(2k1+1)k2},l$ represents the N terms of the polynomial for a given value of $(2k_1+1)k_2$, with the position of $Y_{(2k1+1)k2},l$ within the polynomial being given by the variable $Z^l$.

Substituting (14) into (12) yields $$\bar{X}_{k1,(2k1+1)k2} = \sum_{l=1}^{N-1} Y_{(2k1+1)k2,l} Z^l \text{ modulo}(Z - W^{2k1+1}) \qquad (15)$$

Since $Z = W^{2k1+1}$, relation (15) may be written as $$\bar{X}_{k1,(2k1+1)k2} = \sum_{l=0}^{N-1} Y_{(2k1+1)k2,l} W^l W^{2lk1} \qquad (16)$$

The terms of the DFT $\bar{X}_{k1,k2}$ are obtained through a simple permutation of the terms of the DFT $\bar{X}_{k1,(2k1+1)k2}$, as a result of which the couple of indicates $k_1,(2k_1+1)k_2$ becomes $k_1,k_2$.

In summary, the computation of the DFT $\bar{X}_{k1,k2}$ of the samples $x_{n1,n2}$ involves the steps of:
  computing the polynomials $x_{n2}(Z)$ from the samples $x_{n1,n2}$ in accordance with relation (8),
  computing the polynomials $\bar{X}_{(2k1+1)k2}(Z)$ in accordance with relation (13),
  computing the DFT $\bar{X}_{k1,(2k1+1)k2}$ in accordance with relation (16), and
  obtaining the terms of the DFT $\bar{X}_{k1,k2}$ through a simple permutation of the terms of $\bar{X}_{k1,(2k1+1)k2}$.

A first embodiment of the apparatus of the present invention will now be described with reference to FIG. 1.

Assume that it is desired to compute the two-dimensional DFT $\bar{X}_{k1,k2}$, with $k_1,k_2 = 0, 1, \ldots, N-1$ of N blocks of N terms each, where N is power of 2. These terms will be written as $$x_{n1,n2} \qquad n_1, n_2 = 0, 1, \ldots, N-1$$

where $n_1$ denotes the position of a given term within a block, and $n_2$ denotes that block.

These N blocks of N terms could represent, for example, an image defined by $N \times N$ samples, with each block making up a row of samples. For the sake of clarity, it will be assumed in the following description that an image is to be processed, and $x_{n1,n2}$ will be termed a "sample" and a block a "row". Accordingly, the index $n_1$ will indicate the position of a given sample within a row and the index $n_2$ will indicate that row.

It will further be assumed that these samples are coded in digital form and stored in a memory 10.

The rows of samples are sequentially read out of the memory 10 and loaded in a N-stage shift register 12 under the control of a control memory 11. The memory 11 is conventionally comprised of a read-only memory which contains a microprogram controlling the sequence of readout operations performed in the memory 10. The sequence of operations is adapted to the capacity of the output bus of the memory 10, to the number N of samples and to the number of bits used to code each sample. For example, assuming that the capacity of the output bus is sixteen bits, that N is equal to 16 and that a single bit is used to code each sample, then the sixteen samples in a given row can be read out and loaded in the register 12 simultaneously. The N samples $$x_{0,n2}, \ldots, x_{n1,n2}, \ldots, x_{N-1,n2}$$

within any row loaded in the register 12 are respectively applied to N multipliers $13, \ldots, 14, \ldots, 15$ in which they are respectively multiplied by the quantities $W^0, \ldots, W^{-n1}, \ldots, W^{-(N-1)}$, where $W = e^{-j\pi/N}$.

(In order to avoid using parentheses, the quantity $W^{-(N-1)}$ has been shown as $W^{1-N}$ in the FIG.).

It should be noted at this point that since W is a complex quantity and since the samples $x_{n1,n2}$ may be complex quantities, the N multipliers $13, \ldots, 14, \ldots, 15$ are conventional complex multipliers. These provide the following sequence of N terms $$x_{0,n2} W^0, \ldots, x_{n1,n2} W^{-n1}, \ldots, x_{N-1,n2} W^{-(N-1)} \qquad (17)$$

which are respectively loaded in the N stages of a register 16.

The sequence of N terms (17) may be expressed in polynomial algebra by means of the polynomial $$X_{n2}(Z) = \sum_{n1=0}^{N-1} x_{n1n2} W^{-n1} Z^{n1}$$

which is the polynomial already given by relation (8). Note that the variable $z^{n1}$ indicates the position of the term x within the sequence, and that, although relation (8) includes the summation sign Σ, the various terms of the sequence are not actually summed together. Relation (8) is merely intended to enable the sequence (17) to be represented. Thereafter, the sequence (17) will be referred to as the polynomial $X_{n2}(Z)$.

The N terms of the polynomial $X_{n2}(Z)$ contained in the register 16 are then loaded in a memory 17 under the control of the memory 11. After all terms within the N rows of samples stored in the memory 10 have successively been multiplied by the quantities $W^0, \ldots, W^{-n2}, \ldots, W^{-(N-1)}$, the N polynomials $x_{n2}(Z)$, with $n_2$ varying between 0 and $(N-1)$, are available in the memory 17. The polynomials $X_{n2}(Z)$ are sequentially read out of the memory 17 and loaded in a N-stage register 18 under the control of the memory 11. The polynomials contained in the register 18 are sequentially applied through a bus 19 to a device 20 which computes the N polynomials $\overline{X}_{(2k_1+1)k_2}(Z)$ in accordance with the polynomial transform defined by relation (13), this being done under the control of the memory 11 via a bus 72. An exemplary embodiment of the device 20 will be described later with reference to FIG. 2.

The N polynomials $\overline{X}_{(2k_1+1)k_2}(Z)$ are stored in a memory 21 via a bus 22.

The terms of the polynomials $\overline{X}_{(2k_1+1)k_2}(Z)$ will be written $Y_{(2k_1+1)k_2,l}$ with $l=0, 1, \ldots, N-1$.

The polynomial $\overline{X}_{(2k_1+1)k_2}(Z)$ can therefore be expressed by means of relation (14), which is repeated below for convenience:

$$\overline{X}_{(2k_1+1)k_2}(Z) = \sum_{l=0}^{N-1} Y_{(2k_1+1)k_2,l} Z^l \qquad (14)$$

The N polynomials $\overline{X}_{(2k_1+1)k_2}(Z)$, with $(2k_1+1)k_2=0, 1, \ldots, n-1$, are read out of the memory 21 and sequentially loaded in a N-stage register 23 under the control of the memory 11. The N terms $$Y_{(2k_1+1)k_2, 0} \ldots Y_{(2k_1+1)k_2, 1} \ldots Y_{(2k_1+1)k_2, (N-1)}$$

of each polynomial $\overline{X}_{(2k_1+1)k_2}(Z)$ are respectively applied to N complex multipliers $24, \ldots, 25, \ldots, 26$, in which they are respectively multiplied by the quantities $$W^0, \ldots, W^l, \ldots, W^{N-1}$$

The following N terms are respectively obtained at the output of the N multipliers and loaded in a N-stage register 27:

$$Y_{(2k_1+1)k_2, 0} W^0 \ldots Y_{(2k_1+1)k_2, l} W^l \ldots Y_{(2k_1+1)k_2, N-1} W^{N-1} \qquad (18)$$

If we put $$s_{(2k_1+1)k_2, l} = Y_{(2k+1)k_2, l} W^l \qquad (19)$$

we may represent the sequence (18) by the polynomial of N terms $$\overline{S}_{(2k_1+1)k_2}(Z) = \sum_{l=0}^{N-1} s_{(2k_1+1)k_2, l} Z^l \qquad (20)$$

The N terms of each of the polynomials $\overline{S}_{(2k_1+1)k_2}(Z)$ available in the register 27 are fed to a device 28 which operates to compute one-dimensional DFTs. This device may be any of the many commercially available devices that use the fast Fourier transform technique for computing DFTs. An exemplary embodiment of such a device is described in "Theory and Application of Digital Signal Processing", by L. R. Rabiner and B. Gold, published by Prentice-Hall, Englewood Cliffs, N.J. 1975, Chapter 10, pp. 573–626.

From the N terms of each of the polynomials $\overline{S}_{(2k_1+1)k_2}(Z)$, the device 28 computes the N terms of the DFT $$\sum_{l=0}^{N-1} s_{(2k_1+1)k_2, l} e^{-j2\pi l k_1/N}, \quad k_1 = 0, 1, \ldots, N-1 \qquad (21)$$

It will be noted that, since $W = e^{-j\pi/N}$, relation (21) is in fact the DFT $\overline{X}_{k_1(2k_1+1)k_2}$ already given by relation (16), which is repeated below for convenience:

$$\overline{X}_{k_1,(2k_1+1)k_2} = \sum_{l=0}^{N-1} Y_{(2k_1+1)k_2,l} W^l W^{2lk_1} \qquad (16)$$

The N terms of the DFT $\overline{X}_{k_1,(2k_1+1)k_2}$ supplied by the device 28 are stored in a memory 29. More specifically, each of these N terms is stored in a memory location whose address is representative of the value of the couple of indices $k_1, (2k_1+1)k_2$ corresponding to the term involved. For example, the term $\overline{X}_{3,4}$ would be stored at an address representative of the couple of values 3, 4.

The device 28 supplies N terms from each of the N polynomials $\overline{S}_{(2k_1+1)k_2}(Z)$. After the polynomials have been sequentially applied to the device 28, the memory 29 contains the $N^2$ terms of the DFT $\overline{X}_{k_1,(2k_1+1)k_2}$.

As mentioned in the above discussion of the principles of operation of the present apparatus, all of the terms of the DFT $\overline{X}_{k_1,k_2}$ are obtained through a permutation of the terms of the DFT $\overline{X}_{k_1,(2k_1+1)k_2}$. This permutation takes place as the latter terms are read out of the memory 29, with the index $(2k_1+1)k_2$ being converted to $k_2$.

This is achieved under the control of the memory 11 by means of tables such as the one shown below.

Assuming that $N=8$ and that it is desired to read out the eight terms corresponding to $$k_1 = 1 \text{ and } k_2 = 0, 1, \ldots, 7$$

the following table will be used:

| Value of $k_1$ | Value of $k_2$ | Value of $(2k_1 + 1)k_2$ modulo 8 | Hexadecimal Address |
|---|---|---|---|
| 1 | 0 | 0 | 10 |
| 1 | 1 | 3 | 13 |
| 1 | 2 | 6 | 16 |
| 1 | 3 | 1 | 11 |
| 1 | 4 | 4 | 14 |
| 1 | 5 | 7 | 17 |
| 1 | 6 | 2 | 12 |
| 1 | 7 | 5 | 15 |

This table shows that, for example, the term $\overline{X}_{1,2}$ of the DFT $\overline{X}_{k_1,k_2}$ will be found at the address 16 of the memory 29.

Figure 2:
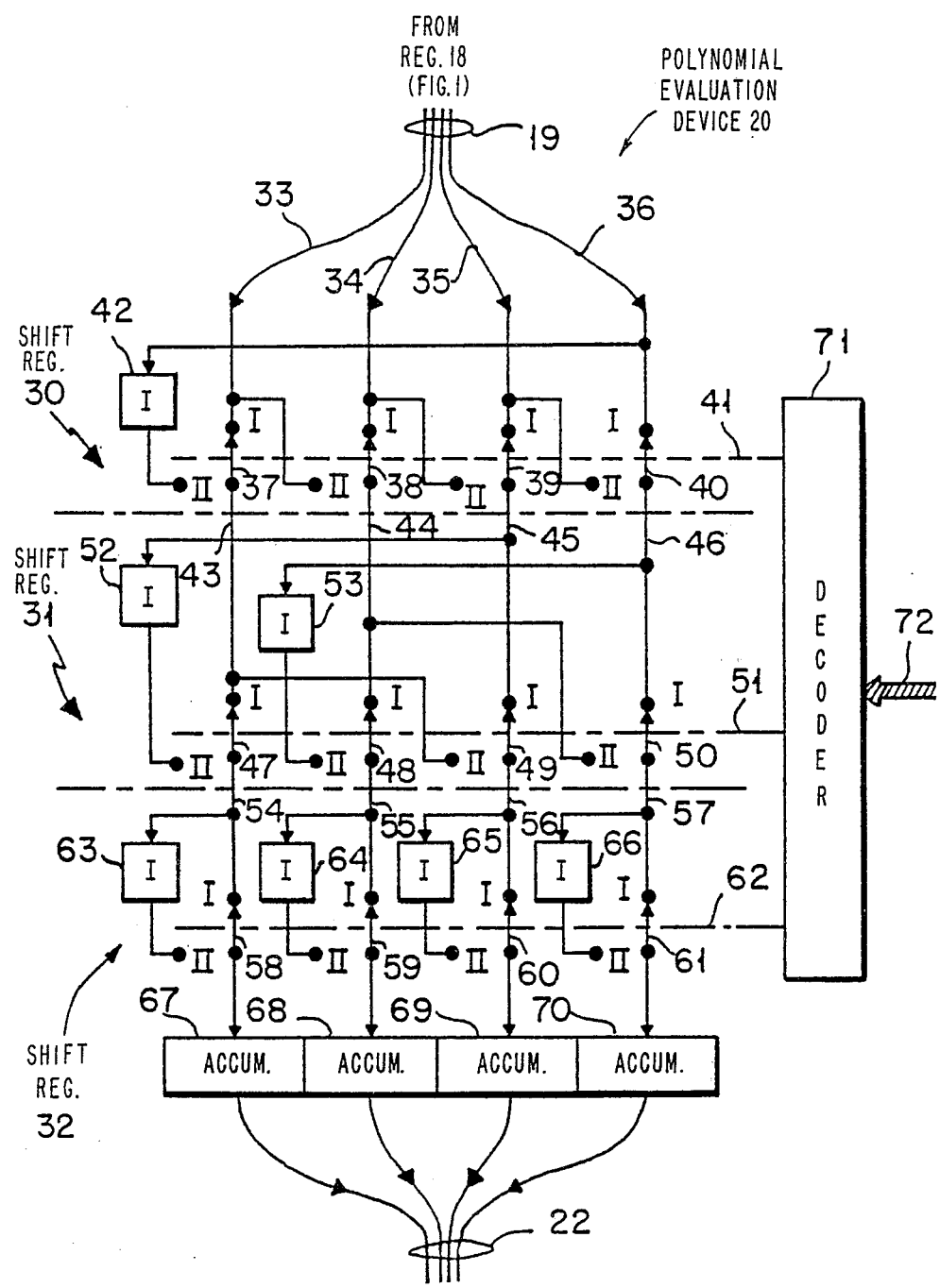
FIG. 2 illustrates an exemplary embodiment of the device 20 of FIG. 1 which operates to compute polynomial transforms.

Referring now to FIG. 2, an exemplary embodiment of the device 20, which is used to compute polynomial transforms, will be described. For clarity, it has been assumed that $N=4$. The device of FIG. 2 includes three cascade-connected shift stages 30, 31, and 32. In the illustrated example, the output bus 19 of the register 18 (FIG. 1) comprises four lines 33–36 which are respectively connected to position I of four two-position switches 37–40, all of which are simultaneously controlled by a signal impressed on a line 41. The lines 33–35 are respectively connected to position II of the switches 38–40, and the line 36 is connected to position II of the switch 37 through an inverter 42. The outputs of the switches 37–40 are respectively connected via lines 43–46 to position I of four switches 47–50, all of which are simultaneously controlled by a signal received via a line 51. The lines 43 and 44 are respectively connected to position II of the switches 49 and 50, while the lines 45 and 46 are respectively connected to position II of the switches 47 and 48 through inverters 52 and 53. The outputs of the switches 47-50 are respectively connected via lines 54-57 to position I of four switches 58-61, all of which are simultaneously controlled by a signal traveling on a line 62. The lines 54-57 are respectively connected through four inverters 63-66 to position II of the switches 58-61, whose outputs are respectively applied to four accumulators 67-70 which have their outputs connected to the four lines in the buss 22 (FIG. 1). A decoder 71 receives the commands generated by the control memory 11 via the bus 72 and has three outputs respectively connected to the lines 41, 51, and 62. The operation of the device of FIG. 2 will now be described in relation to an exemplary situation. The device of FIG. 2 receives from the register 18 the successive polynomials defined by relation (8) and computes the polynomial transform $$\overline{X}_{(2k_1+1)k_2}(Z) = \sum_{n_2=0}^{N-1} X_{n_2}(Z) Z^{2n_2 k_2} \text{modulo } (Z^N + 1) \quad (13)$$

$\overline{X}_{(2k_1+1)k_2}$ is a polynomial transform of $N^2$ terms whose computation involves multiplications by powers of Z and additions. Since relation (13) is defined modulo $(Z^N+1)$, we have $Z^N = -1$, and the multiplications by powers of Z correspond to simple rotations of the terms of $X_{n_2}(Z)$ within the polynomial followed by sign inversion of the overflow terms.

Assume the following polynomials $X_{n_2}(Z)$, $n_2 = 0, 1, 2, 3$:

$$X_0(Z) = b_{0,0} \quad b_{1,0} \quad b_{2,0} \quad b_{3,0} \quad (22)$$

$$X_1(Z) = b_{0,1} \quad b_{1,1} \quad b_{2,1} \quad b_{3,1}$$

$$X_2(Z) = b_{0,2} \quad b_{1,2} \quad b_{2,2} \quad b_{3,2}$$

$$X_3(Z) = b_{0,3} \quad b_{1,3} \quad b_{2,3} \quad b_{3,3}$$

Using relations (22), the device of FIG. 2 should provide the following polynomials:

for $k_2 = 0$: (23)

$$\overline{X}_0(Z) = X_0(Z) + X_1(Z) + X_2(Z) + X_3(Z)$$

for $k_2 = 1$:

$$\overline{X}_{2k_1+1}(Z) = X_0(Z) + X_1(Z)Z^2 + X_2(Z)Z^4 + X_3(Z)Z^6$$

for $k_2 = 2$:

$$\overline{X}_{2(2k_1+1)}(Z) = X_0(Z) + X_1(Z)Z^4 + X_2(Z)Z^8 + X_3(Z)Z^{12}$$

for $k_2 = 3$:

$$\overline{X}_{3(2k_1+1)}(Z) = X_0(Z) + X_1(Z)Z^6 + X_2(Z)Z^{12} + X_3(Z)Z^{18}$$

Since $Z^4 = -1$, we have $Z^8 = 1$ and relations (23) may be written as $$\overline{X}_0(Z) = X_0(Z) + X_1(Z) + X_2(Z) + X_3(Z) \quad (24)$$

$$\overline{X}_{2k_1+1}(Z) = X_0(Z) + X_1(Z)Z^2 + X_2(Z)Z^4 + X_3(Z)Z^6$$

$$\overline{X}_{2(2k_1+1)}(Z) = X_0(Z) + X_1(Z)Z^4 + X_2(Z) + X_3(Z)Z^4$$

$$\overline{X}_{3(2k_1+1)}(Z) = X_0(Z) + X_1(Z)Z^6 + X_2(Z)Z^4 + X_3(Z)Z^2$$

Still referring to FIG. 2, the polynomial $X_0(Z)$ is available in the register 18. The decoder 71 receives from the control memory 11 a command representative of the value of the exponent modulo 8 of Z in relation (13), i.e., a command representative of the value of $2n_2k_2$ modulo 8. Initially, $k_2=0$, $n_2=0$, the command present on the bus 72 is representative of the value 0, and the signals on the lines 41, 51 and 62, which lines correspond to the binary weights $2^0$, $2^1$ and $2^2$, are at a down level, so that the switches 37-40, 47-50 and 58-61 are all set to position I. The terms $b_{0,0}$, $b_{1,0}$, $b_{2,0}$, $b_{3,0}$ of $X_0(Z)$ are directly loaded in the accumulators 67-70.

The polynomial $X_1(Z)$ thus becomes available in the register 18. We now have $k_2=0$ and $n_2=1$, the command present on the bus 72 still is representative of the value 0, and the terms $b_{1,1}$, $b_{2,1}$, $b_{3,1}$ of $X_1(Z)$ are respectively added to the terms $b_{0,0}$, $b_{1,0}$, $b_{2,0}$ and $b_{3,0}$ contained in the accumulators 67-70. The process continues and, after $X_3(Z)$ has been loaded in the register 18, the terms of the polynomial $\overline{X}_0(Z)$ are obtained in the accumulators 67-70 in accordance with relations (24). These terms are then loaded in the memory 21 (FIG. 1) via the bus 22, and the accumulators 67-70 are reset to zero. Note, that the polynomials $X_{n_2}(Z)$ are read out of the memory 17 by means of conventional read/write operations to ensure that they will not be erased in the memory 17. The polynomials $X_0(Z)$ is again read out of the memory 17 and loaded in the register 18. We now have $k_2=1$, $n_2=0$, the command present on the bus 72 is representative of the value 0, and the terms of $S_0(Z)$ are loaded in the accumulators 67-70. The polynomials $X_1(Z)$ thus, becomes available in the register 18. We now have $k_2=1$ and $n_2=1$ and the command on the bus 72 is representative of the value 2. The signals on the lines 41 and 62 are both at a down level and the signal on the line 51 is at an up level. The switches 37-40 and 58-61 are set to position I while the switches 47-50 are set to position II. The term $b_{0,1}$ of $X_1(Z)$ is loaded in the accumulator 69 through the line 33, the switch 37 (set to position I), the line 43, the switch 49 (set to position II), the line 56 and the switch 60 (set to position I). The term $b_{1,1}$ is similarly loaded in the accumulator 70. The term $b_{2,1}$ is inverted and loaded in the accumulator 67 through the line 35, the switch 39 (set to position I), the line 45, the inverter 52, the switch 47 (set to position II), the line 54, and the switch 58 (set to position I). Similarly, the term $b_{3,1}$ is inverted and loaded in the accumulator 68. The polynomial $S_2(Z)$ thus, becomes available in the register 18. We now have $k_2=1$ and $n_2=2$, and the command present on the bus 72 is representative of the value 4. The signals on the lines 41 and 51 are both at a down level and the signal on the line 62 is at an up level; the switches 37-40 and 47-50 are all set to position I and the switches 58-61 are all set to position II. The terms $b_{0,2}$, $b_{1,2}$, $b_{2,2}$ and $b_{3,3}$ are respectively inverted by the inverters 63-66 and loaded in the accumulators 67-70. The polynomial $X_3(Z)$ is then available in the register 18. We now have $k_2=1$ and $n_2=3$ and the command present on the bus 72 is representative of the value 6. The signal present on the line 41 is at a down level and the signals present on the lines 51 and 62 are both at an up level. The switches 37-40 are all set to position I and the switches 47-50 and 58-61 are all set to position II. The term $b_{0,3}$ is inverted by the inverter 65 and loaded in the accumulator 69. The term $b_{1,3}$ is inverted by the inverter 66 and loaded in the accumulator 70. The term $b_{2,3}$ is inverted twice by the accumulators 52 and 63 and is therefore loaded unchanged in the accumulator 67. The term $b_{3,3}$ is inverted twice by the inverters 53 and 64 and is consequently loaded unchanged in the accumulator 68. The terms of the polynomial $\overline{X}_{2k_1+1}(Z)$ are obtained in the accumulators 67-70 in accordance with relations (24). These terms are then loaded in the memory 21 via the bus 22 and the accumulators 67-70 are reset to zero.

It will be apparent to those skilled in the art that the terms of the polynomials $$\overline{X}_{2(2k_1+1)}(Z) \text{ and } \overline{X}_{3(2k_1+1)}(Z)$$

will similarly be obtained after two additional cycles.

The embodiment of the device 20 as illustrated in FIG. 2 is only given by way of example and it will be apparent to those skilled in the art that the polynomial transform defined by relation (13) could also be computed by means of a fast Fourier transform (FET) decomposition.

Figure 3:
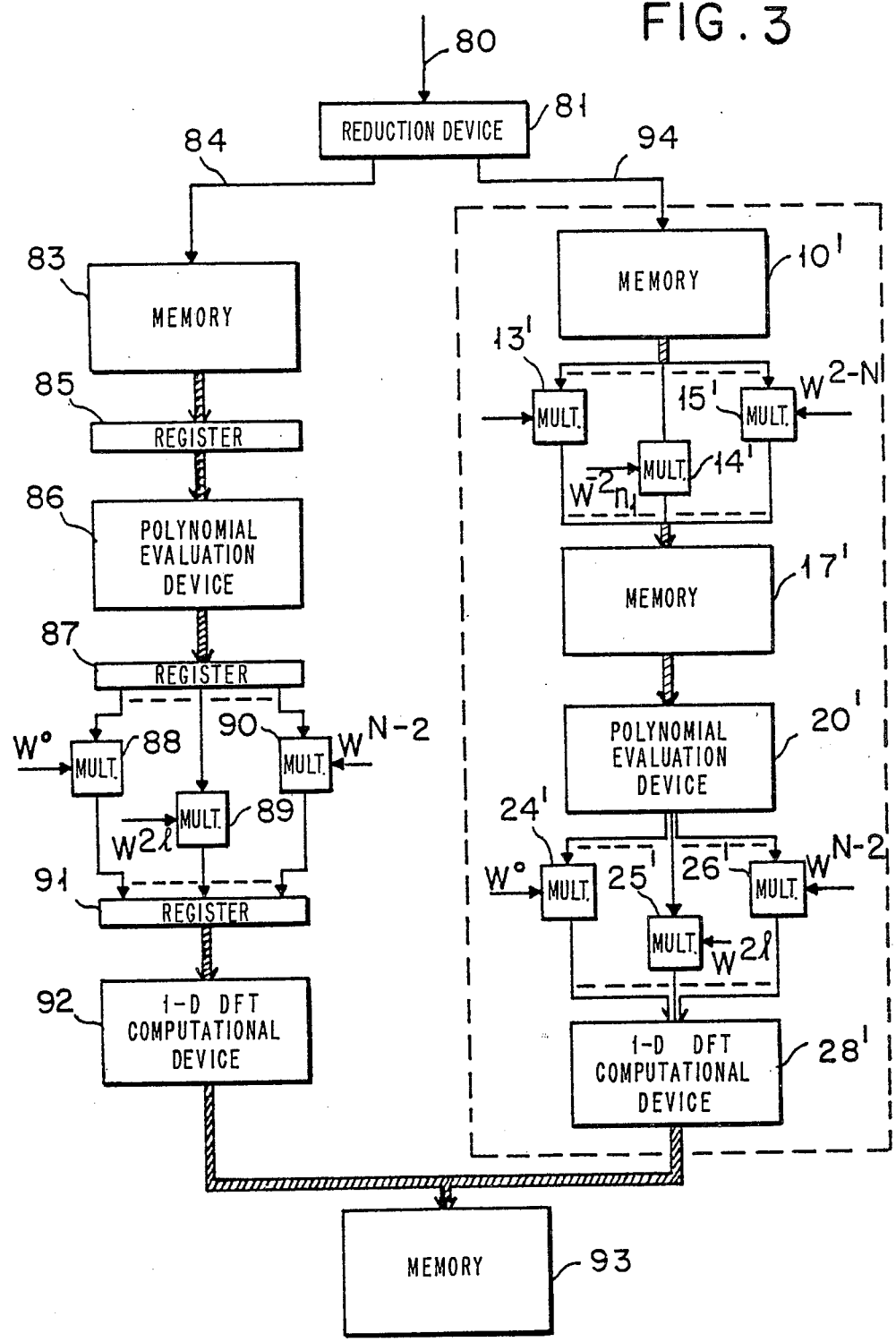
FIG. 3 shows a second embodiment of the invention.

One of the advantages of the apparatus of FIG. 1 is that it uses a single polynomial transform instead of several as proposed in the aforementioned article by H. Nussbaumer and P. Quandalle published in "Proceedings of 1979 IEEE International Conference on Acoustics, Speech and Signal Processing". However, the greater simplicity of the apparatus of FIG. 1 is achieved at the cost of a slightly higher number of arithmetic operations. The second embodiment of the present invention shown in FIG. 3 is a compromise between the degree of complexity of the apparatus and the number of arithmetic operations required. The second embodiment uses the apparatus of FIG. 1 and the method of reducing polynomials discussed in the article just mentioned.

Before describing the apparatus of FIG. 3, its principles of operation will be discussed. To this end, the representation of the DFT $\overline{X}_{k_1, k_2}$ given by relation (7) will be replaced by the following equivalent polynomial representation:

$$x_{n_2}(Z) = \sum_{n_1=0}^{N-1} x_{n_1,n_2} Z^{n_1} \quad (25)$$

$$\overline{X}_{k_2}(Z) = \sum_{n_2=0}^{N-1} X_{n_2}(Z) W^{2n_2 k_2} \text{ modulo } (Z^N - 1) \quad (26)$$

$$\overline{X}_{k_1,k_2}(Z) \equiv \overline{X}_{k_2}(Z) \text{ modulo } (Z - W^{2k_1}) \quad (27)$$

$(Z^N - 1)$ is the product of the two polynomials $(Z^{N/2}-1)$ and $(Z^{N/2}+1)$. Each of the polynomials $X_{n_2}(Z)$ of the relation (25) is reduced modulo $(Z^{N/2}+1)$ and modulo $(Z^{N/2}-1)$ so as to obtain reduced polynomial of $N/2$ terms written as $X_{n_2}^1(Z)$ and $X_{n_2}^2(Z)$, respectively.

As stated earlier, reductions modulo $(Z^{N/2}-1)$ and modulo $(Z^{N/2}+1)$ of the polynomial $X_{n_2}(Z)$ of $N$ terms will respectively yield the following polynomials of $N/2$ terms:

$$X_{n_2}^1(Z) = \sum_{n_1=0}^{N/2-1} (x_{n_1,n_2} - x_{n_1+N/2,n_2}) Z^{n_1}$$

$$X_{n_2}^2(Z) = \sum_{n_1=0}^{N/2-1} (x_{n_1,n_2} + x_{n_1+N/2,n_2}) Z^{n_1}$$

We also have $$Z^{N/2} + 1 = \prod_{k_1=0}^{N-1} (Z - W^{2k_1}) \text{ for } k_1 \text{ odd}$$

$$Z^{N/2} - 1 = \prod_{k_1=0}^{N-1} (Z - W^{2k_1}) \text{ for } k_1 \text{ even.}$$

The polynomial representation of relations (25) to (27) can be split up as follows:

—for $k_1$ odd:

$$X_{n_2}^1(Z) = \sum_{n_1=0}^{N/2-1} (x_{n_1,n_2} - x_{n_1+N/2,n_2}) Z^{n_1} \quad (28)$$

$$\overline{X}_{k_2}^1(Z) = \sum_{n_2=0}^{N-1} X_{n_2}^1(Z) W^{2n_2 k_2} \text{ modulo } (Z^{N/2} + 1) \quad (29)$$

$$\overline{X}_{k_1,k_2} \equiv \overline{X}_{k_2}^1(Z) \text{ modulo } (Z - W^{2k_1}) \quad (30)$$

—for $k_1$ even:

$$X_{n_2}^2(Z) = \sum_{n_1=0}^{N/2-1} (x_{n_1,n_2} + x_{n_1+N/2,n_2}) Z^{n_1} \quad (31)$$

$$\overline{X}_{k_2}^2(Z) = \sum_{n_2=0}^{N-1} X_{n_2}^2(Z) W^{2n_2 k_2} \text{ modulo } (Z^{N/2} - 1) \quad (32)$$

$$\overline{X}_{k_1,k_2} \equiv \overline{X}_{k_2}^2(Z) \text{ modulo } (Z - W^{2k_1}) \quad (33)$$

We shall first consider the case of $k_1$ odd. Since $N$ is a power of 2 and $k_1$ is odd, $N$ and $k_1$ are relatively prime and the product $k_1 k_2$ modulo $N$ maps all values of $k_2$. The product $k_1 k_2$ modulo $N$ is a simple permutation of the indices $k_2$. Thus, $k_1 k_2$ may be substituted for $k_2$ in relations (29) and (30), and the equivalent relations (34) and (35) are respectively obtained:

$$\overline{X}_{k_1 k_2}^1(Z) = \sum_{n_2=0}^{N-1} X_{n_2}^1(Z) W^{2n_2 k_1 k_2} \text{ modulo } (Z^{N/2} + 1) \quad (34)$$

$$\overline{X}_{k_1,k_1 k_2} \equiv \overline{X}_{k_1 k_2}^1 \text{ modulo } (Z - W^{2k_1}) \quad (35)$$

Since $X_{k_1 k_2}$ is defined modulo $(Z - W^{2k_1})$ in accordance with relation (35), we have $Z = W^{2k_1}$ and we may substitute $Z$ for $W^{2k_1}$ in relation (34), which becomes $$\overline{X}_{k_1 k_2}^1(Z) = \sum_{n_2=0}^{N-1} X_{n_2}^1(Z) Z^{n_2 k_2} \text{ modulo } (Z^{N/2} + 1) \quad (36)$$

$\overline{X}_{k_1 k_2}^1(Z)$ is a polynomial of $N/2$ terms which may be written as $$\overline{X}_{k_1 k_2}^1 = \sum_{l=0}^{N/2-1} u_{k_1 k_2, l} Z^l \quad (37)$$

Substituting (37) into (35) yields $$\overline{X}_{k_1,k_1 k_2} = \sum_{l=0}^{N/2-1} u_{k_1 k_2, l} Z^l \text{ modulo } (Z - W^{2k_1}) \quad (38)$$

Since $Z = W^{2k_1}$, relation (38) may be written as $$\overline{X}_{k_1,k_1 k_2} = \sum_{l=0}^{N/2-1} u_{k_1 k_2, l} W^{2lk_1} \quad (39)$$

Since $k_1$ is odd, we may put $$k_1 = 2p+1 \quad p = 0, 1, \ldots, N/2-1$$

Relation (39) may then be written as $$\overline{X}_{(2p+1),(2p+1)k_2} = \sum_{l=0}^{N/2-1} u_{(2p+1)k_2,l} W^{2l} W^{4pl} \quad (40)$$

Relation (40) corresponds to the one-dimensional DFT of the N/2 terms of $$u_{(2p+1)k_2,l} W^{2l}.$$

The N/2 terms of the DFT $\overline{X}_{(2p+1),k_2}$ for $p = 0, 1, \ldots, N/2-1$ and $k_2 = 0, 1, \ldots, N-1$, that is, the terms of $\overline{X}_{k_1,k_2}$ that correspond to $k_1$ odd, will be obtained through a simple permutation of the terms of $$\overline{X}_{(2p+1),(2p+1)k_2},$$

as a result of which the couple of indices $(2p+1)$, $(2p+1)k_2$ will become $(2p+1)$, $k_2$.

The case of $k_1$ even will now be discussed.

To this end, the representation given by relations (31) to (33) will be replaced by the following equivalent relations:

$$x_{n_2}^{20}(Z) = \sum_{n_2=0}^{N/2-1} (x_{n_1,n_2} + x_{n_1+N/2,n_2}) W^{-2n_1} Z^{n_1} \quad (41)$$

$$\overline{X}_{k_2}^2(Z) = \sum_{n_2=0}^{N-1} x_n^{20}(Z) W^{2n_2 k_2} \text{ modulo } (Z^{N/2} + 1) \quad (42)$$

$$\overline{X}_{k_1,k_2} \equiv \overline{X}_{k_2}^2(Z) \text{ modulo } (Z - W^{2(2k_1+1)}) \quad (43)$$

Since N is a power of 2 and $(2k_1+1)$ is odd, as has been seen, $(2k_1+1)k_2$ can be substituted for $k_2$ in relations (42) and (43), which yields the equivalent relations $$\overline{X}_{(2k_1+1)k_2}^2(Z) = \sum_{n_2=0}^{N-1} x_{n_2}^{20}(Z) W^{2n_2 k_2(2k_1+1)} \text{ modulo } (Z^{N/2} + 1) \quad (44)$$

$$\overline{X}_{k_1,(2k_1+1)k_2} \equiv \overline{X}_{(2k_1+1)k_2}^2(Z) \text{ modulo } (Z - W^{2(2k_1+1)}) \quad (45)$$

Since $Z = W^{2(2k_1+1)}$ in accordance with (45), relation (44) becomes $$\overline{X}_{(2k_1+1)k_2}^2(Z) = \sum_{n_2=0}^{N-1} x_{n_2}^{20}(Z) Z^{n_2 k_2} \text{ modulo } (Z^{N/2} + 1) \quad (46)$$

$\overline{X}_{(2k_1+1)k_2}(Z)$ is a polynomial of N/2 terms which may be written $$\overline{X}_{(2k_1+1)k_2}^2(Z) = \sum_{l=0}^{N/2-1} v_{(2k_1+1)k_2,l} Z^l \quad (47)$$

Substituting (47) into (45) yields $$\overline{X}_{k_1,(2k_1+1)k_2} \equiv \sum_{l=0}^{N/2-1} v_{(2k_1+1)k_2,l} Z^l \text{ modulo } (Z - W^{(2k_1+1)}) \quad (48)$$

Since $Z = W^{2(2k_1+1)}$, relation (48) may be written $$\overline{X}_{k_1,(2k_1+1)k_2} = \sum_{l=0}^{N/2-1} v_{(2k_1+1)k_2,l} W^{2l(2k_1+1)} \quad (49)$$

$$\overline{X}_{k_1,(2k_1+1)k_2} = \sum_{l=0}^{N/2-1} v_{(2k_1+1)k_2,l} W^{2l(2k_1+1)} \quad (49)$$

or $$\overline{X}_{k_1,(2k_1+1)k_2} = \sum_{l=0}^{N/2-1} v_{(2k_1+1)k_2,l} W^{2l} W^{4lk_1} \quad (50)$$

Since $k_1$ is even, we may put $$k_1 = 2p \quad p = 0, 1, \ldots, N/2-1$$

and write relation (50) as $$\overline{X}_{2p,(4p+1)k_2} = \sum_{l=0}^{N/2-1} v_{(4p+1)k_2,l} W^{2l} W^{8pl} \quad (51)$$

Relation (51) corresponds to the one-dimensional DFT of the N/2 terms $v_{(2p+1)k_2,l} W^{2l}$.

The $N^2/2$ terms of the DFT $\overline{X}_{2p,k_2}$, for $p = 0, 1, \ldots, N/2-1$ and $k_2 = 0, 1, \ldots, N-1$, that is, the terms of $\overline{X}_{k_1,k_2}$ which corresponds to $k_1$ even, will be obtained through a simple permutation of the terms of $\overline{X}_{2p,(2p+1)k_2}$ whereby the couple of indices $2p,(4p+1)k_2$ will be substituted for the couple of indices $2p,k_2$.

Referring next to FIG. 3, the second embodiment of the present invention will be described. As in the example illustrated in FIG. 1, it will be assumed that it is desired to compute the two-dimensional DFT $$\overline{X}_{k_1,k_2} \quad k_1, k_2 = 0, 1, \ldots, N-1$$

of an image defined by N×N samples $$x_{n_1,n_2} \quad n_1, n_2 = 0, 1, \ldots, N-1.$$

The $N^2$ terms of the DFT $\overline{X}_{k_1,k_2}$ include the $N^2/2$ terms of the DFT written as $$\overline{X}_{(2p+1),k_2} \quad p = 0, 1, \ldots, N/2-1$$

which correspond to $k_1$ odd, and the $n^2/2$ terms of the DFT written as $\overline{X}_{2p,k_2}$ which correspond to $k_1$ even.

The rows of samples $x_{n_1,n_2}$ stored, for example, in a memory, as they were in the apparatus of FIG. 1, are sequentially applied via a line 80 to a reduction device 81 to be described in detail with reference to FIG. 4. The device 81 operates to reduce each row of N samples to:

a polynomial of N/2 terms $X_{n_2}^1(Z)$ as defined by relation (28), and a polynomial of N/2 terms $X_{n_2}^2(Z)$ as defined by relation (31).

The terms of the polynomials $X_{n_2}^1(Z)$, $n_2 = 0, 1, \ldots, N-1$ from which the $N^2/2$ terms of the DFT $\overline{X}_{k_1,k_2}$ that correspond to $k_1$ even will be derived, are stored in a memory 83 via a line 84.

The N polynomials $X_{n_2}^1(Z)$ are sequentially read out of the memory 83 and loaded in a N/2-stage register 85. The polynomials $X_{n_2}^1(Z)$ stored in the register 85 are sequentially applied to a device 86 which computes the polynomial transform $\overline{X}_{k_1 k_2}^1(Z)$ in accordance with relation (36), which is repeated below for convenience:

$$\overline{x}^1_{k_1k_2}(Z) = \sum_{n_2=0}^{N-1} X^1_{n_2}(Z)Z^{n_2k_2} \text{ modulo } (Z^{N/2} + 1) \quad (36)$$

and may also be written $$\overline{x}^1_{(2p+1)k_2}(Z) = \sum_{n_2=0}^{N-1} X^1_{n_2}(Z)Z^{n_2k_2} \text{ modulo } (Z^{N/2} + 1) \quad (52)$$

The device 86 is of course similar to the device 20 (FIG. 1) an exemplary embodiment of which has been described with reference to FIG. 2. As has been seen, $\overline{X}^1_{(2p+1)k_2}$ represents N polynomials of N/2 terms each and each polynomial is in turn represented by the following relation, which is identical to relation (37):

$$\overline{x}^1_{(2p+1)k_2} = \sum_{l=0}^{N/2-1} u_{(2p+1)k_2,l} Z^l \quad (53)$$

The polynomials $\overline{X}^1_{(2p+1)k_2}(Z)$ are sequentially loaded in a N/2-stage register 87. The N/2 terms of a given polynomial $\overline{X}^1_{(2p+1)k_2}(Z)$, that is, the N/2 terms $$u_{(2p+1)k_2,0}, \ldots, u_{(2p+1)k_2,l}, \ldots, u_{(2p+1)k_2,N/2-1}$$

contained in the register 89, are respectively applied to N/2 complex multipliers 88, . . . , 89, . . . , 90 in which they are respectively multiplied by the quantities $$W^0, \ldots, W^{2l}, \ldots, W^{2(N/2-1)}.$$

The following N/2 terms are respectively obtained at the output of these N/2 multipliers:

$$u_{(2p+1)k_2,0} \cdot W^0, \ldots, u_{(2p+1)k_2,l} W^{2l}, \ldots, \\ u_{(2p+1)k_2,N/2-1} W^{2(N/2-1)}$$

and loaded in a N/2-stage register 91. The N/2 terms contained in the register 91 are then applied to a device 92 which computes the N/2 terms of the one-dimensional DFT $$\sum_{l=0}^{N/2-1} u_{(2p+1)k_2,l} W^{2l} e^{-j\frac{\pi}{N}(4pl)} \quad (4pl)$$

which is the DFT $\overline{X}_{(2p+1),(2p+1)k_2}$ of relation (40).

These N/2 terms are stored in a memory 93, with each term being stored in a memory location whose address is representative of the value of the couple of indices (2p+1), (2p+1)k₂ corresponding to the term involved, as explained earlier with reference to FIG. 1. The device 92 supplies N/2 terms from each of the N polynomials successively stored in the register 91. After these N polynomials have been processed by the device 92, the $N^2/2$ terms of the two-dimensional DFT $\overline{X}_{k_1,k_2}$ that correspond to $k_1$ off are available in the memory 93.

The method of processing the polynomials $X_{n_2}{}^2(Z)$ from which the terms of the DFT $\overline{X}_{k_1,k_2}$ that correspond to $k_1$ even are derived will now be described.

The polynomial $X_{n_2}{}^2(Z)$ supplied by the reduction device 81 are processed by an apparatus similar to that of FIG. 1. In the interest of clarity, this apparatus has been shown in a dash box in FIG. 3 and a prime notation has been used to distinguish certain elements of FIG. 3 from corresponding elements of FIG. 1 identified with similar reference numerals. (For simplicity, the various registers 12, 16 . . . , of FIG. 1 have not been shown in the equivalent apparatus illustrated in FIG. 3). The polynomials $X_{n_2}{}^2(Z)$ supplied by the reduction device 81 are stored in a memory 10' via a line 94.

The N/2 terms of a given polynomial $X_{n_2}{}^2(Z)$ that are available in the memory 10' are respectively applied to the N/2 complex multipliers 13', . . . , 14'. . . , 15' in which they are respectively multiplied by the quantities $$W^0, \ldots, W^{-2n_1}, \ldots, W^{-2(N/2-1)}$$

In the FIG., $W^{-2(N/2-)}$ has been written in the form $W^{2-N}$).

After the respective terms have been multiplied by each of the above quantities, each of the polynomials $X_{n_2}{}^2(Z)$ is converted to a polynomial $X_{n_2}{}^{20}(Z)$ as defined by relation (41), which is repeated below $$X_{n_2}^{20}(Z) = \sum_{n_2=0}^{N/2-1} (x_{n_1,n_2} + x_{n_1+N/2,n_2}) W^{-2n_1} Z^{n_1} \quad (41)$$

The polynomials $X_{n_2}{}^{20}(Z)$ successively provided by the multipliers 13', . . . , 14', . . . , 15', are stored in a memory 17', and are sequentially applied to a device 20' which computes the polynomial transform $\overline{X}_{(2k_1+1)k_2}{}^2(Z)$ in accordance with relation (46), which is repeated below:

$$\overline{x}^2_{(2k_1+1)k_2}(Z) = \sum_{n_2=0}^{N-1} X^{20}_{n_2}(Z) Z^{n_2k_2} \text{ modulo } (Z^{N/2} + 1) \quad (46)$$

Since $k_1=2p$, $p=0,1, \ldots, N/2-1$, relation (46) is identical to the following relation:

$$\overline{x}^2_{(4p+1)k_2}(Z) = \sum_{n_1=0}^{N-1} X^{20}_{n_2}(Z) Z^{n_2k_2} \text{ modulo } (Z^{N/2} + 1)$$

The device 20' is of course similar to the device 20 of FIG. 1.

As has been seen, $\overline{X}_{(4p+1)k_2}{}^2(Z)$ represents N polynomials of N/2 terms each, and each polynomial can in turn be represented by means of the following relation, which is identical to relation (47):

$$\overline{x}^2_{(4p+1)k_2}(Z) = \sum_{l=0}^{N/2-1} v_{(4p+1)k_2,l} Z^l \quad (54)$$

The N/2 terms of each of the N polynomials $\overline{X}_{(4p+1)k_2}{}^2$ (Z) successively provided by the device 20' are respectively multiplied in the N/2 multipliers 24', . . . , 25', . . , 26, by the quantities $$W^0, \ldots, W^{2l}, \ldots, W^{2(N/2-1)}$$

In the FIG., $W^{2(N/2-1)}$ has been written as $W^{N-2}$).

The following N/2 terms are respectively obtained at the output of these N/2 multipliers $$v_{(4p+1)k_2,0} W^0, \ldots, v_{(4p+1)k_2,l} W^{2l} \ldots \\ v_{(4p+1)k_2,N/2-1} W^{2(N/2-1)}$$

and applied to a device 28' which computes the N/2 terms of the one-dimensional DFT $$\sum_{l=0}^{N/2-1} v_{(4p+1)k_2,l} W^{2l} e^{-j\frac{\pi}{N}(8pl)}$$

which is the DFT $\overline{X}_{2p,(4p+1)k_2}$ of relation (52).

These N/2 terms are stored in the memory 93, each term being stored in a memory location whose address is representative of the value of the couple of indices 2p, (4p+1)$k_2$ corresponding to that term, as explained earlier with respect to FIG. 1.

It will be apparent to those skilled in the art that the apparatus of FIG. 3 is controlled by a control memory (not shown, for simplicity). The term of $\overline{X}_{k_1,k_2}$ are read out of the memory 93 under the control of said control memory, taking into account the following permutations of indices:

for $k_1$ odd:

$$k_1, k_2 \rightarrow (2p+1), (2p+1)k_2$$

with $k_1 = 2p+1$, $p = 0, 1, \ldots, N/2-1$.
for $k_1$ even:

$$k_1, k_2 \rightarrow 2p, (4p+1)k_2$$

with $k_2 = 2p$, $p = 0, 1, \ldots, N/2-1$.

To this end, tables such as the one shown below by way of example are used by the control memory. Assuming that N = 8 and that it is desired to read out the 8 terms of $\overline{X}_{k_1,k_2}$ that correspond to $k_2 = 1$ and $k_1 = 0, 1, \ldots, 7$, the following table will be used:

| $k_1$ | $k_2$ | 2p | 2p+1 | (2p+1), (2p+1)$k_2$ modulo 8 | 2p,(4p+1)$k_2$ modulo 8 | Hexadecimal Address |
|---|---|---|---|---|---|---|
| 0 | 1 | 0 | — | — | 0,1 | 01 |
| 1 | 1 | — | 1 | 1,1 | — | 11 |
| 2 | 1 | 2 | — | — | 2,5 | 25 |
| 3 | 1 | — | 3 | 3,3 | — | 33 |
| 4 | 1 | 4 | — | — | 4,1 | 41 |
| 5 | 1 | — | 5 | 5,5 | — | 55 |
| 6 | 1 | 6 | — | — | 6,5 | 65 |
| 7 | 1 | — | 7 | 7,7 | — | 77 |

This table shows that, for example, the terms $\overline{X}_{1,1}$ and $\overline{X}_{6,1}$ of the DFT $\overline{X}_{k_1,k_2}$ will respectively be found at the address 11 and 65 of the memory 93.

Figure 4:
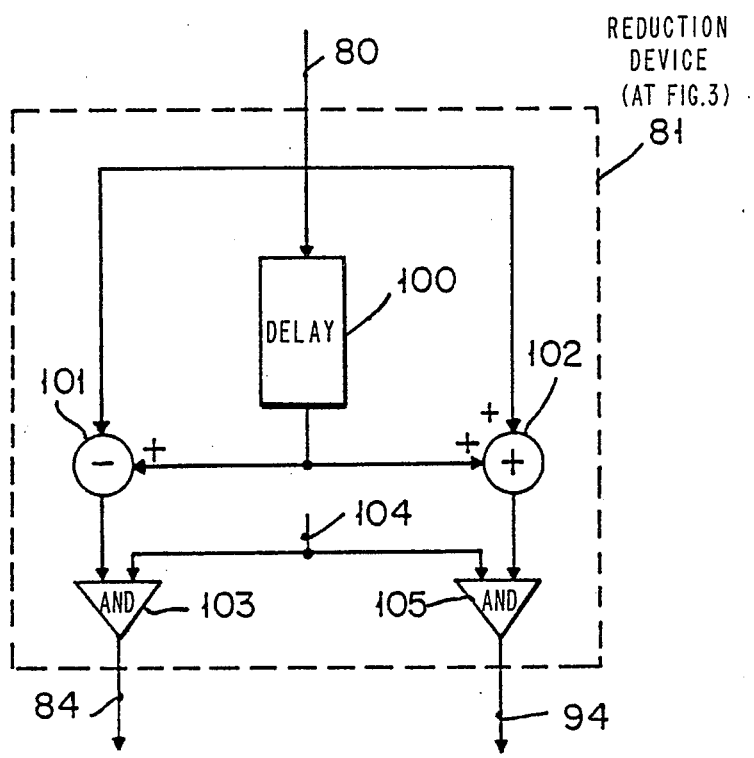
FIG. 4 illustrates an exemplary embodiment of the reduction device 81 of FIG. 3.

Referring next to FIG. 4, an exemplary embodiment of the reduction device 81 of FIG. 2 will be described.

The samples $x_{n_1,n_2}$ are applied via the line 80 to the input of a delay element 100 which introduces a delay equal to N/2 times the time interval elapsing between the transmission of two consecutive samples on line 80. This line is connected to the (−) input of a subtractor 101 which has its (+) input connected to the output of the delay element 100. The line 80 is also connected to an input of an adder 102 which has its other input connected to the output of the delay element 100. The output of the subtractor 101 is connected to an input of an AND gate 103 which has its other input connected to a line 104. The output of the adder 102 is connected to an input of an AND gate 105 which has its other input connected to the line 104. The outputs of the AND gates 103 and 105 are respectively connected to the lines 84 and 94 (FIG. 3).

In operation, the rows of samples are serially applied to the line 80.

While the first N/2 samples within each row, i.e., the samples $x_{n_1,n_2}$ for $n_1 = 0, 1 \ldots, N/2-1$, are applied to the line 80, the line 104 is at a down level so that the AND gates 103 and 105 are inhibited. While the last N/2 samples within each row, i.e., the samples $x_{n_1,n_2}$ for $n_1 = 0, 1, \ldots, N/2-1$, are applied to the line 80, the line 104 is at an up level, so that the AND gates 103 and 105 are activated. When the sample $x_{n_1+N/2,n_2}$ is applied to the line 80, the sample $x_{n_1,n_2}$ available at the output of the delay element 100, and the terms $(x_{n_1,n_2} - x_{n_1+N/2,n_2})$ and $(x_{n_1,n_2} + x_{n_1+N/2,n_2})$ are respectively provided on the lines 84 and 94. Thus, the terms of the polynomials $X_{n_2}^1(Z)$ and $X_{n_2}^2(Z)$ respectively defined by relations (28) and (31) are sequentially obtained on the lines 84 and 94.

While the invention has been particularly shown and described with reference to a preferred embodiment thereof, it will be understood by those skilled in the art that numerous changes in form and detail may be made therein without departing from the spirit and scope of the invention.

Having thus described my invention, what I claim as new, and desire to secure by Letters Patent is:

1. An apparatus for computing the two-dimensional discrete Fourier transform of N first blocks of N terms each, wherein each term is processed in the represent apparatus by appropriate electrical signals with N being a power of 2, said apparatus including:

means for receiving and storing said N first blocks of N terms for later access, first multiplication means for respectively multiplying the N terms of each of said N blocks by N first complex coefficients whose value is dependent upon the position of the terms within the blocks, thereby providing N second blocks of N terms, transformation means for converting said N second blocks of N terms into N third blocks of N terms, each of said N third blocks of N terms being a combination of said N second blocks of N terms, second multiplication means for respectively multiplying the N terms of each of said third blocks by N second complex coefficients whose value is dependent upon the position of the terms within the blocks, thereby providing N fourth blocks of N terms, and means for computing the N terms of the one-dimensional discrete Fourier transform of each of said N fourth blocks of N terms, thereby providing the $N^2$ terms of the two-dimensional discrete Fourier transform of said N first blocks of N terms.

2. An apparatus as set forth in claim 1, wherein said N first complex coefficients are equal to $W^{-n_1}$, with $n_1 = 0, 1, \ldots, N-1$, where $W = e$ and $n_1$ indicates the position of the corresponding term within the block and wherein said transformation means includes means for converting said N blocks of N terms into said N third blocks of N terms in accordance with the polynomial transform $$\overline{X}_{(2k_1+1)k_2}(Z) = \sum_{n_1=0}^{N-1} X_{n_2}(Z) Z^{2n_2 k_2} \text{ modulo } (Z^N + 1)$$

where $\overline{X}_{(2k_1+1)k_2}$, with $k_1, k_2 = 0, 1, \ldots, N-1$, and with the product $(2k_1+1)k_2$ being defined modulo N, represents said N third blocks;

$X_{n_2}(Z)$, with $n_2 = 0, 1, \ldots, N-1$, represents said N second blocks; and the multiplications by powers of Z correspond to rotations of the terms within the block together with a sign inversion of the overflow terms.

3. An apparatus as set forth in claim 2, wherein said N second complex coefficients are equal to $W^{n_1}$ with $n_1 = 0, 1, \ldots, N-1$, and means for evaluating the term $n_1$ to determine the position of the corresponding term within the block.

4. An apparatus for computing the two-dimensional discrete Fourier transform of N blocks of N terms, wherein each term is processed in the apparatus and represented by appropriate electrical signals with N being a power of 2, said apparatus comprising:

means for receiving and storing said N blocks of N terms for later access, reduction means for reducing each of said blocks of N terms to first and second reduced blocks of N/2 terms each, first multiplication means for respectively multiplying the N/2 terms of each of said N first reduced blocks of N/2 terms by N/2 first complex coefficients whose value is dependent upon the position of the terms within the blocks, thereby providing N third reduced blocks of N/2 terms, first transformation means for converting said N third reduced blocks into N fourth reduced blocks of N/2 terms, with each of said N fourth reduced blocks being a combination of said N third reduced blocks, second multiplication means for respectively multiplying the N/2 terms of each of said N fourth reduced blocks by N/2 second complex coefficients whose value is dependent upon the position of the terms within the blocks, thereby providing N fifth reduced blocks of N/2 terms, means for computing the N/2 terms of the one-dimensional discrete Fourier transform of each of said fifth reduced blocks, thereby providing $N^2/2$ terms of the two-dimensional discrete Fourier transform of said N blocks of N terms, second transformation means for converting said N second reduced blocks into N sixth reduced blocks of N/2 terms, with each of said N sixth reduced blocks being a combination of said N second reduced blocks, third multiplication means for respectively multiplying the N/2 terms of each of said N sixth reduced blocks by N/2 third complex coefficients whose value is dependent upon the position of the terms within the blocks, thereby providing N seventh reduced blocks of N/2 terms, and means for computing the N/2 terms of the one-dimensional discrete Fourier transform of each of said seventh reduced blocks, thereby providing the remaining $N^2/2$ terms of the two-dimensional discrete Fourier transform of said N blocks of N terms.

5. An apparatus as set forth in claim 4, characterized in that said N/2 first complex coefficients are equal to $W^{-2n_1}$, $n_1 = 0, 1, \ldots, N/2-1$, where $W = e^{-j\pi/N}$ and $n_1$ indicates the position of the corresponding term within the block, and wherein said first transformation means includes means for converting said N third reduced blocks into N fourth reduced blocks in accordance with the polynomial transform:

$$\overline{X}^2_{(2k_1+1)k_2}(Z) = \sum_{n_2=0}^{N/1} X^{20}_{n_2}(Z) Z^{n_2 k_2} \text{ modulo } (Z^{N/2} + 1)$$

where:

$\overline{X}_{(2k_1+1)k_2}$, with $k_1 = 2p$, $p = 0, 1, \ldots, N/2-1$ $k_2 = 0, 1, \ldots, N-1$, and with the product $(2k_1+1)k_2$ being defined modulo N, represents said N fourth reduced blocks;

$X^{20}_{n_2}(Z)$, with $n_2 = 0, 1, \ldots, N-1$, represents said N third reduced blocks; and the multiplications by powers of Z correspond to rotations of the terms within the block together with a sign inversion of the overflow terms.

6. An apparatus as set forth in claim 5, wherein said N/2 second complex coefficients are equal to $W^{2l}$, with $l = 0, 1, \ldots, N/2-1$ and means for evaluating the term $l$ to determine the position of the corresponding term within the block.

* * * * *